United States Patent
Drout et al.

[11] 3,941,636
[45] Mar. 2, 1976

[54] PROCESS FOR FORMING DECORATIVE SURFACE COVERINGS

[75] Inventors: Frank G. Drout; Douglas R. Eyman, both of Lancaster, Pa.

[73] Assignee: Armstrong Cork Company, Lancaster, Pa.

[22] Filed: June 28, 1974

[21] Appl. No.: 483,927

Related U.S. Application Data

[63] Continuation of Ser. No. 355,318, April 30, 1973, abandoned.

[52] U.S. Cl. .............. 156/154; 156/240; 156/246; 156/277; 264/46.4; 264/112; 264/126; 264/131; 264/132; 264/245; 264/254; 427/152; 427/264
[51] Int. Cl.² B32B 31/26; B32B 5/28; B32B 27/30; B32B 31/12
[58] Field of Search .......... 156/240, 239, 238, 231, 156/232, 277, 79, 241, 242, 246, 194; 117/3.4; 161/406; 427/148, 152, 195, 198, 203, 264; 264/112, 126, 131, 132, 245, 254, 46.4

[56] References Cited
UNITED STATES PATENTS

| | | | |
|---|---|---|---|
| 592,186 | 10/1897 | Bedford .......................... | 156/239 X |
| 2,371,868 | 3/1945 | Berg et al. ........................ | 264/54 X |
| 2,631,643 | 3/1953 | Schueler .......................... | 156/240 X |
| 2,696,452 | 12/1954 | Trepp ............................. | 156/240 |
| 2,874,416 | 2/1959 | Burnett ........................... | 156/240 X |
| 3,192,294 | 6/1965 | Streed et al. ..................... | 264/126 X |
| 3,309,804 | 3/1967 | Gill ............................... | 156/240 X |
| 3,359,352 | 12/1967 | Powell et al. ..................... | 264/47 |
| 3,378,617 | 4/1968 | Elmendorf ........................ | 264/126 |
| 3,658,617 | 4/1972 | Fearnow et al. .................. | 156/238 X |
| 3,804,657 | 4/1974 | Eyman et al. ..................... | 117/11 |

Primary Examiner—Douglas J. Drummond
Assistant Examiner—Thomas Bokan

[57] ABSTRACT

A process for producing a decorative surface covering wherein granular dryblend is deposited on a releasable carrier and heated to form a porous cohesive layer. Settable resinous inks are then applied to selected areas of the dryblend to form a design which may extend partially or completely through the layer to the bottom surface thereof which ultimately becomes the face of the surface covering. The ink may optionally be set by heat prior to or simultaneously with the subsequent application and gelling of a resinous back coating which may be reinforced by included or attached material to form a permanent carrier. The release carrier is then removed. A multi-level wear surface is achieved on the surface covering by removing the non-ink-containing portions of the dryblend either before or after the composite structure is turned over and heat is applied to fuse the remaining resinous material.

12 Claims, 2 Drawing Figures

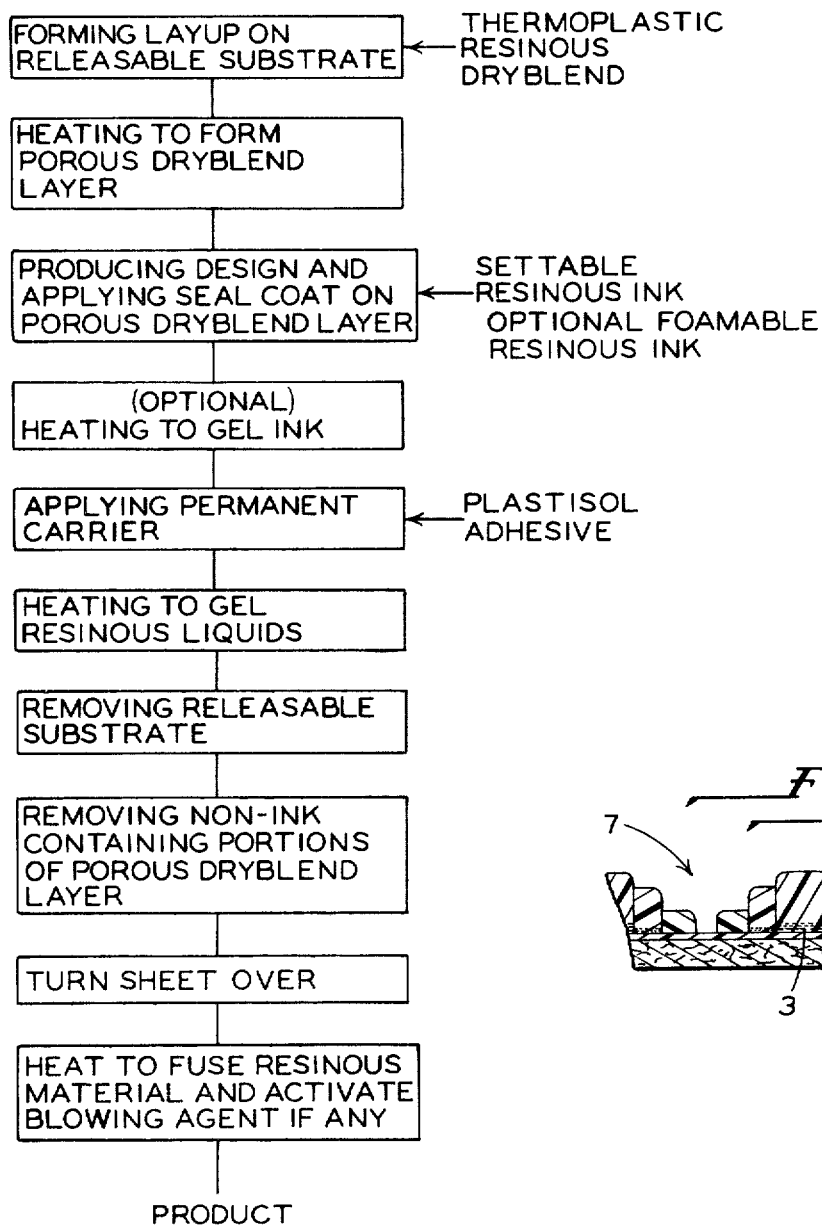
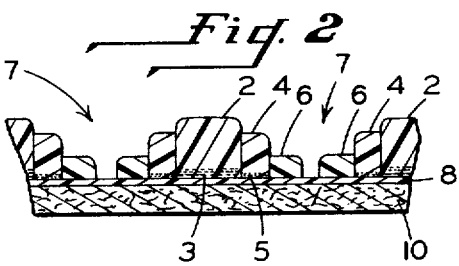

PROCESS FOR FORMING DECORATIVE SURFACE COVERINGS

CROSS REFERENCE TO RELATED APPLICATIONS

This is a continuation of U.S. Patent Application Ser. No. 355,318, filed Apr. 30, 1973 by Frank G. Drout, et al now abandoned. The invention herein is an improvement over copending U.S. Application Ser. No. 483,971 filed June 28, 1974 in the name of Elvin M. Weidman and entitled Process for Forming Decorative Surface Coverings and The Product Thereof.

BACKGROUND OF THE INVENTION

1. Field of the Invention

This invention relates generally to a process for forming resinous composition surface coverings and more particularly to an "upside-down" process for forming such a product wherein a resinous dryblend layup is formed on a release carrier and heated to form a porous cohesive layer. Settable inks are applied to and set within the dryblend layer to create a design thereon which may extend through the thickness thereof from the back to the extent desired. A permanent carrier is then applied and the release carrier is removed. A deeply embossed multi-level decorative surface may be achieved on the product by brushing or otherwise removing the non-design carrying portions of the dryblend prior to the final fusion step.

2. Description of the Prior Art

It is known to enhance the appearance of plastic floor and wall coverings by means of various decorative designs thereon which may extend partially or entirely through the sheet. Further enhancement of the appearance of such sheets has been accomplished by achieving a three-dimensional appearance thereon. Prior methods of doing this have included mechanical or chemical embossing techniques or inclusion with the granules of the sheet-forming composition of an ingredient which can be subsequently removed or altered to produce an embossed effect. It is also known to form a decorative surface covering by applying a resinous coating to a releasable carrier, decorate the coating, apply the backing and then remove the releasable carrier and invert the product for use.

One method for producing a through-grained pattern on a flexible floor covering is shown by U.S. Pat. No. 592,186 wherein granular linoleum-forming material is preconsolidated on a backing sheet at a slightly elevated temperature to form a porous mass. The partially consolidated mass is then printed by means of printing blocks or rollers so that the colored or inlaid effect penetrates to a greater or lesser extent the substance of the linoleum. The sheet is then fully consolidated by heat and pressure.

U.S. Pat. No. 3,359,352 describes depositing a layer of fine granules of resinous composition on the surface of the base, heating to sinter the granules and form a porous layer, printing a design on the sintered layer with a printing composition which will penetrate into the porous composition and then, by heat, with or without pressure, forming the printed porous layer into a non-porous layer containing an inlaid design.

Copending U.S. Patent Application Ser. No. 483,971, filed June 28, 1974, in the name of Elvin M. Weidman, relates to a process for forming decorative smooth surfaced surface covering wherein a sintered resinous dryblend layer is formed on a releasable carrier. Settable resinous inks are then applied to selected surface areas thereof in overlapping relationship. The inks may penetrate completely or only partially through the dryblend layer and, after fusion of all of the resinous material, form clearly defined, in-register design areas which, after removal of the releasable carrier and inversion of the sheet, are visible from the wear surface which during processing was the surface which was in contact with the releasable substrate.

U.S. Pat. No. 3,804,657 relates to a process for producing a resinous composition surface covering having a multi-level decorative surface by depositing a layer of granular resinous dryblend on a backing sheet, heating the granules to form a porous cohesive layer therefrom, cooling the layer and applying settable resinous inks thereto to form a design thereon, gelling the ink, removing non-design carrying portions of the porous layer, and heating to fuse all of the remaining resinous material.

Another method of forming a decorated thermoplastic resinous sheet is shown by U.S. Pat. No. 2,874,416, wherein a thin layer of thermoplastic resin is applied to a carrier sheet, a design is printed on the resinous sheet before any film strength has developed therein; a body layer of a thermoplastic resin is applied over the printed design; the layers are fused by application of heat thereto; and, the resulting decorated sheet is stripped from the carrier.

U.S. Pat. No. 3,378,617 relates to a method of facing building products with exposed mineral granules wherein the mineral granules are deposited on and embedded up to their median plane in a layer of smaller inert particles which have been spread on a supporting surface. An inorganic binder is spread over the layer of granules and then the inert particles are removed from the spaces between the granules by brushing, for example, after the binder is set.

In the embodiment of the present invention relating to the formation of a multi-level decorative surface on resinous surface covering, the porous cohesive layer of dryblend is printed with settable resinous inks on what ultimately becomes the back of the sheet. The color of smallest area coverage is printed first and it may extend partway or substantially completely through the dryblend layer. The remaining colors which progressively increase in their area coverage are then printed thereover one on top of the other. These inks are also of predetermined viscosity and are applied in amounts predetermined to ensure the desired degree of penetration to the porous dryblend. The process of this invention may conveniently result in a thickness of the thinnest color area of about 10 to 15 mils. The other color areas may increase in their thickness up to the total thickness of the dryblend layer. Upon subsequent removal of the dryblend from the non-printed areas, the most elevated color areas will always be the thickest and, since all of the colors extend through to what will become the back of the final sheet, retention of the original pattern for the life of the surface covering is assured.

SUMMARY OF THE INVENTION

This invention relates to an "upside-down" process for producing a through-grain decorative wear surface on resinous composition surface covering wherein a layup of resinous dryblend is formed on a releasable carrier and heated to form a porous cohesive layer.

After cooling the porous layer, a design is produced thereon by applying, preferably by printing, settable resinous inks which are subsequently set by heat. The unique feature of the process is that the inks are applied to what ultimately becomes the back side of the wear surface of the surface covering, and penetrate through the dryblend layer either completely, or in predetermined varying degrees to result in a decoration which, in the finished product, extends from the backing up toward the wear surface.

In one embodiment of the invention the design is "stack-printed" on the porous cohesive dryblend layer on the release carrier by first printing the smallest color area so that it extends through the thickness of the dryblend layer to any desired degree. Increasingly larger areas are then printed thereover which may vary in their degrees of penetration as their lateral dimensions increase. Optionally, the inks may then be heat set and an adhesive and a permanent backing applied, or the adhesive and permanent backing may be applied and then the resin in the composite structure can be heat set. The release carrier is then stripped from the printed sheet which is subsequently brushed to remove the dryblend from the non-printed areas to expose a multi-level pattern of printed dryblend. The dryblend in the printed areas is firmly bound in place by the settable inks. The brushing may optionally be done either before or after (in indifferent order) the sheet is turned over and heated to fuse the remaining resinous material.

Since, by the process of this invention, the base plastisol layer is applied onto a porous cohesive dryblend body, air bubbles normally encountered in the usual process for forming such a floor covering caused by air entrapped between the base material and the bottom of the dryblend layer applied thereto are eliminated. Fidelity of the printing is increased and out-of-register printing and subsequent overprinting corrections therefor are no longer a problem since, by this process, through-penetration of the ink is assured and when the sheet is viewed from the side formerly in contact with the releasable carrier, overprinting cannot be observed. Also, by this process, in-register printing of base colors is made possible, increasing the design possibilities greatly. Through the process of this invention, a foam-backed product may be produced, for example, by merely adding a foamable layer of dryblend over the reinforced permanent carrier prior to the final fusion step, or by laminating a foamed backing to the printed surface. Since, by this process, the printing extends from the back to or up toward the face of the wear layer, an improved decorative wear surface is achieved and the foregoing extra cost-increasing operations are eliminated. Further, as previously stated, by the process of this invention there is no mixing or stirring of dryblend and plastisol and no drag on the carrier when loose dryblend is fed into the wet base plastisol as was formerly the case, since with "upside-down printing" the base plastisol is applied on top of the sintered dryblend.

In addition, former "stack printing" or color-on-color printing required heat-gelling of the ink between nearly every application thereof. This is not required in the process of the present invention.

BRIEF DESCRIPTION OF THE DRAWING

FIG. 1 is a flow diagram depicting the steps followed in carrying out the method of this invention; and FIG. 2 is a cross-sectional view illustrating a portion of a surface covering having a multi-level wear surface made by using the "stack printing" method of this invention.

DESCRIPTION OF THE PREFERRED EMBODIMENT

As shown by the flow diagram in FIG. 1 of the drawings, the manufacturing process begins with the formation of a layer of thermoplastic resinous dryblend such as plasticized poly(vinyl chloride) on a releasable carrier of a type commonly used in the art. The dryblend layer may have a thickness in the range of from about 25 mils to 100 mils and may be formed by drawing the carrier beneath a bank of dryblend positioned in front of a screed roll mounted an appropriate distance above the carrier. The carrier may comprise an oleo-resinous-saturated felt or a beater-saturated asbestos felt, for example, which may be coated with a methylated cellulose release agent such as the reaction product of cellulose fibers and methyl chloride. Silicone release agents may also be used.

The resinous mix commonly referred to as a vinyl dryblend is in the form of a free-flowing powder which is a homogeneous mixture of unfused thermoplastic vinyl resin particles, liquid vinyl plasticizers, filler, pigment, and vinyl stabilizer.

The free-flowing mix of resin, plasticizer, stabilizer, pigment and filler may be readily formed by mixing the resin, for example a homopolymer of vinyl chloride, in the form of discrete particles, with the vinyl resin plasticizer such as di(2-ethylhexyl) phthalate, butyl benzyl phthalate, epoxidized soybean oil, or tricresyl phosphate, filler, and pigment, and suitable vinyl resin stabilizers. Mixing may be carried out in a standard mixer or blender such as a Henschel blender where the ingredients are mixed under moderate heat, for instance at a temperature of about 200° F., for a period of time to ensure that the liquid plasticizer and stabilizers become diffused throughout the resin particles, and the remaining ingredients become adsorbed thereon. Care is taken so that no fusion of the resin particles occurs during the mixing and the temperature must be kept below the point at which such fusion would occur.

Generally speaking, the addition of fillers and pigments to the mix may be made either initially, at the end of the mixing cycle when the resin particles remain relatively warm, or after the dry-blended resin particles have been mixed and cooled. The color of the layers may be controlled over a wide range and substantially transparent or translucent layers may be achieved by omitting the filler and most or all of the pigment from the vinyl dryblend forming these layers. Based on 100 parts by weight of resin, 15 to 60 parts by weight plasticizer, 2 to 5 parts by weight stabilizer, 0 to 5 parts by weight pigment, and 0 to 25 parts by weight filler may be used in forming the powdery, free-flowing mixture.

A plastisol can be defined as a thermoplastic resin in the form of fine particles thoroughly and uniformly dispersed in plasticizer in the presence of small amounts of pigments, filler and stabilizers. A plastisol has appreciable fluidity at normal room temperatures but is converted by heat into a flexible, tough thermoplastic mass. This ultimate result is brought about by the process of fusion wherein the resin becomes plasticized and solvated by the plasticizer.

The next step in the process following formation of the layer of dryblend on the releasable carrier involves heating the dryblend to cause partial melting of the resin granules at their points of contact, thereby forming bonds which result in formation of a porous cohesive layer having a thickness in the range of from about 20 mils to 85 mils. Bonding of the resinous granules at their points of contact may be effected either by sintering or, through activation of a suitable external adhesive coating which may be applied in the final steps of granulation.

The next step of the invention involves the production of a design on the porous layer by the application of settable resinous inks. The term "settable" as used herein with reference to the ink is meant to include thermoplastic and thermosetting inks which may be set or gelled either by heat or chemical means. Therefore, after cooling, the porous layer may be printed with the ink in a manner and in sufficient amounts and of proper viscosities to cause penetration thereof through a part of the thickness of the porous layer or through the entire thickness thereof. Printing may be done, for example, by a Zimmer printer, sold by Zimmer America, Spartanberg, S.C. The combinations of the parts and settings of this printer may be varied to achieve varying degrees of penetration of the ink into a porous surface. The inks may be colored as desired by means of dyes or pigments, or the inks may be colorless.

Optionally, sufficient heat may then be applied to gel or set the inks which then act as a bond for the dryblend to convert the printed area to a strong, coherent region. The gelling or setting of the ink is accomplished at a temperature below the fusion temperature of the granular thermoplastic resinous material. Alternatively, the ink may be set chemically. The heating step may be delayed, however, depending on the permanent carrier (backing) to be used, until after the permanent carrier has been applied. The permanent carrier may comprise any of the backings normally used as a floor covering backing such as a beater saturated rubber-asbestos sheet, resin-bonded glass webs, bonded synthetic webs, and asphalt-saturated felts. These carriers may be the only final backing or they may be supplemented with other cushioning materials, such as foams and non-woven material. Optionally, the permanent carrier may be coated with a plastisol base coat before application to the printed porous dryblend layer; the plastisol coating may be applied to the printed porous layer first and then the backing applied or, the plastisol coating and backing may be applied simultaneously to the printed porous layer. In an alternate procedure, after the plastisol coating has been applied to the printed porous dryblend layer, a glass mat is pressed into the wet plastisol prior to gelling the composite and this structure alone then constitutes the permanent carrier or backing. Optionally, the plastisol base coat may be pigmented and/or incorporate glass fibers and/or fillers such as coarse limestone or silica, along with a blowing agent or metallic particles to produce desirable visual or physical characteristics in the final product. Another feature of this invention is that the plastisol coating applied to what ultimately becomes the back of the surface covering wear layer may be multicolored and printed in register. In addition, the permanent carrier itself may be decorated to provide additional variation in the appearance of the face of the surface covering. By this process a more clearly defined decorative wear surface is obtained in the finished product since overprinting may be deliberately used to assure coverage of the area desired but when viewed from the side that becomes the face of the finished sheet, the overprinting cannot be seen and the boundary lines of the design are sharp and clear. Following application of the permanent carrier, the composite structure may then be heated to gel the plastisol and the inks (if they were not previously gelled). The releasable carrier is then removed.

After removing the releasable carrier, a substantial portion or all of the non-ink containing portions of the porous dryblend layer are removed prior to the final fusion step to obtain an embossed or multi-level wear surface on the surface covering. Removal of the granules, if lightly bonded as is usually the case, may be accomplished by mechanical brushing or sandblasting with appropriate particles followed by vacuuming, sweeping, or air blast to remove any remaining lightly bonded or loosened granules of dryblend material from the unprinted areas. The bonds between the sintered PVC granules of the dryblend also may be loosened physically or mechanically prior to brushing by application of a solvent, such as xylene, by printing or coating methods. The bonds between adhesive-coated PVC granules may be loosened by the application of heat or a suitable solvent for the adhesive. In the cases involving solvent application, the solvent can be suitably thickened and applied to the sheet in an overall manner by any conventional coating method, since the gelled printed portions of the porous layer are substantially unaffected by the action of the solvent. Brushing may then be carried out.

Since, when it is desired to obtain a surface covering having a multi-level wear surface, the sintered dryblend in the unprinted areas can be removed down to the backing, or the coating thereon, or to the levels of the ink penetration in the case of "stack printed" structures, considerable depths of relief can be accomplished. Embossing depths of as much as about 35 mils have been achieved, measured from the top of the walking surface to the top of the coated backing after fusion, with different portions of the pattern being embossed to several intermediate depths, with "through-grain" color in all areas.

The next step in the manufacture of the surface covering of this invention is fusion of the resinous material, a plus formation of a foam in any portions having a blowing agent incorporated therein.

The visual and physical characteristics of the embossed surface covering may be further altered by chemical means, mechanical means, or by glossy final coatings to enhance the appearance and utility thereof. For example, texturing of the walking surface may be coordinated in detail with any textured effect produced in a coated backing which has been applied to the dryblend. As previously stated, texturing may be accomplished by the inclusion of various filler materials in a coating applied to the backing before application to the dryblend. Cushioning layers, applied as cellular sheets or foamed latex, may be applied to the backing on the side which will contact the floor.

As shown in FIG. 2 of the drawings, a product which may be produced through the use of the process of this invention is a surface covering having a multi-level decorative wear surface wherein the fused ink-containing portions 2, 4 and 6 extend from their top wear surfaces to coating 8 on the backing 10. Numeral 3 indicates the part of portion 2 penetrated by the inks used for portions 4 and 6 which were printed thereover. Similarly, numeral 5 indicates the part of portion 4 penetrated by the ink of portion 6. Numeral 7 indicates areas from which loosened dryblend granules have been removed.

Products which can be manufactured within the scope of this invention may include but not are limited to, floor coverings, wall coverings, drapery and upholstery materials, and furniture components. Both flexible and rigid multi-level sheet products may be manufactured by the method of this invention without the use of chemical or mechanical embossing equipment and techniques and the depressed areas thereon are in perfect registration with the printed pattern.

The following example is given for the purpose of illustration:

EXAMPLE

Dryblend granules were prepared by mixing the following components together in a Henschel dryblending apparatus through a heat history from ambient conditions to 220° F. to ambient conditions.

|  | Parts |
| --- | --- |
| Poly(Vinyl Chloride) | 100 |
| Dioctyl Phthalate | 35 |
| Modified Tin Maleate (Stabilizer) | 2 |

The granules were deposited on a release-coated beater saturated rubber-asbestos sheet to form a uniform layer about 60 mils thick. The sheet was then passed through an oven in which the granules reached a temperature of about 270°–290° F. and became sintered into a porous cohesive layer about 45 mils thick.

After cooling, the sintered material was printed in a ceramic tile design, using a color-on-color, or "stack printed" pattern. The printing inks had the following composition:

|  | Parts |
| --- | --- |
| Poly(Vinyl Chloride) | 100 |
| Dioctyl Phthalate | 32 |
| 2-2,4-Trimethyl-1,3-Pentanediol Diisobutyrate | 17 |
| Modified Tin Maleate (Stabilizer) | 2 |
| Titanium Dioxide in Dioctyl Phthalate-Pigment Paste | 5 |

Using the above formula, the particle size of the poly(vinyl chloride) was varied to produce three inks having three different viscosities. The ceramic tile design was printed with the three inks using a Zimmer printer.

The release-coated sheet carrying the printed, sintered composition was then heated in an oven for one to two minutes to a surface temperature of 216° F. to gel the printing composition.

Portions of the above material were then processed into finished floor covering material by the following three variations of the "Upside-Down Process".

1. An extruder/laminator setup was used to laminate the permanent carrier (backing) to the printed dryblend. A 10 mil film of the following formulation was extruded directly into the laminator nip to act as the adhesive between the permanent carrier and the printed dryblend:

|  | Parts |
| --- | --- |
| Poly(Vinyl Chloride) | 50.0 |
| Dioctyl Phthalate | 15.0 |
| Butyl Benzyl Phthalate | 3.0 |
| Epoxidized Soya Oil | 2.65 |
| Barium-Cadmium Liquid Stabilizer ("Ferro 5245" sold by Ferro Chemical Company, Bedford, Ohio which is a Ba/Cd phosphate liquid complex stabilizer.) | 2.25 |
| Calcium Carbonate | 0.5 |

This extrudate may be pigmented if desired.

After removal of the release carrier, the material from the lamination process was then passed through a brushing apparatus to remove the unprinted dryblend and expose a multi-level pattern of printed dryblend. The dryblend in any unprinted pattern areas brushes out down to the layer of dryblend particles adhered to the adhesive material, thus forming the "grout" areas of the pattern. The product was then heated in an oven for two to three minutes to a temperature of 420°–440° F. to fuse all remaining resinous material and form, on cooling, an attractive floor covering.

2. The last screen printing station applied an overall coating of an ink designed to yield minimum penetration and seal the surface to prevent penetration of any subsequent coating. This ink had the following formulation:

|  | Parts |
| --- | --- |
| Poly(Vinyl Chloride) | 100 |
| Dioctyl Phthalate | 32 |
| Texanol Isobutyrate (2-2-4-trimethyl-1,3 pentanediol diisobutyrate) | 82 |
| Modified Tin Maleate (Stabilizer) | 2 |
| Silicon Dioxide | 8 |

After gellation of the inks and cooling of the sheet, a reverse roll coater applied an additional 10 mils of the above formulation to the sealed surface of the sheet to act as an adhesive. The permanent carrier was then applied, the adhesive set, and the release carrier removed. Brushing and fusing operations were the same as in variation 1 of this Example.

3. The permanent carrier sheet was reverse roll coated with about 4 to 6 mils of a plastisol adhesive of the following formulation:

|  | Parts |
| --- | --- |
| Poly(Vinyl Chloride) | 100.7 |
| Dioctyl Phthalate | 15.6 |
| Butyl Benzyl Phthalate | 8.0 |
| Epoxidized Tallate | 3.0 |
| Barium/Calcium/Zinc Liquid Organic Compound ("Nuostab" V-1366 sold by Tenneco Chemical, Inc. Piscataway, N.J. which is a Ba/Ca/Zn phosphate liquid complex stabilizer.) | 3.0 |
| Texanol Isobutyrate (2-2-4-trimethyl-1,3 pentanediol diisobutyrate) | 15.0 |

This plastisol is pigmented to the color desired for the "grout" areas of the finished product.

Lamination of the printed dryblend sheet to the adhesive-coated permanent carrier was carried out. Brushing and fusing operations were the same as in previous example variations 1 and 2.

The final product in each case is a multi-level floor covering having a maximum "embossing" depth (in the grout areas) of 0.032inch, with different portions of the pattern "embossed" to several intermediate depths, and with "through-grain" color in all areas.

What is claimed is:

1. A process for producing a surface covering having a decorative multi-level wear layer comprising
   1. depositing at least one layer of unfused thermoplastic granules of resinous dryblend onto a releasable substrate;
   2. heating the dryblend to cause partial melting of at least surface portions of the granules at their points of contact thereby forming bonds between adjacent granules to form a cohesive, porous layer having an upper and a lower surface;
   3. producing a design on said cohesive, porous layer by applying a plurality of differently colored settable resinous inks to the upper surface thereof, each colored ink being successively printed one over the other to cover a larger surface area than the area covered by a preceding printed colored ink, each of said inks being applied in amounts and viscosities sufficient to result in penetration thereof through at least 10% of the thickness of the cohesive, porous layer at the points of application in areas not penetrated by a previously applied ink, the penetration of each colored ink varying to a predetermined degree with the lateral dimensions of its area of coverage and each preceding colored ink being positioned perpendicularly within the boundary of the area covered by the next printed color, resulting in ink-containing and non-ink-containing areas in the cohesive, porous layer in both a direction laterally across the surface of the sheet and in a direction transversely through the sheet from the upper surface to the lower surface thereof;
   4. applying a backing to the upper surface of the printed, porous layer to which said settable resinous inks were applied;
   5. heating to a temperature below the fusion temperature of the dryblend to set the inks;
   6. removing the releasable substrate;
   7. removing the non-ink-containing portions of the cohesive, porous layer from the side formerly in contact with the releasable substrate while leaving the ink-containing portions thereof substantially unaffected; and
   8. heating to fuse all of the remaining resinous material in the composite structure thereby forming a decorative, multi-level, wear layer wherein each of the colored ink-containing design elements extends from the backing to varying levels with respect thereto.

2. The process according to claim 1 wherein the dryblend granules have an adhesive coating.

3. The process according to claim 1 wherein the removal of the non-ink-containing portions of the cohesive porous layer includes the step of applying a solvent to loosen the bonds between the granules.

4. The process according to claim 1 wherein removal of the non-ink-containing portions is effected by brushing.

5. The process according to claim 1 wherein the resinous dryblend is a vinyl resin dryblend.

6. The process according to claim 5 wherein the vinyl resin is poly(vinyl chloride).

7. The process according to claim 1 wherein the step of applying the backing comprises applying a reinforced plastisol coating to the printed porous cohesive layer.

8. The process according to claim 1 wherein the step of applying the backing includes applying a plastisol base coating between a fibrous sheet and the printed porous cohesive layer.

9. The process according to claim 8 wherein the plastisol is a filled plastisol whereby ultimately a textured base coat is attained.

10. The process according to claim 1 wherein the step of producing a design on the cohesive porous layer includes applying a seal coat over substantially the entire surface thereof.

11. The process according to claim 1 wherein the step of applying the backing includes applying a foamable resinous material as the final layer thereof.

12. The process according to claim 11 wherein the final foamable resinous layer is a poly(vinyl chloride) dryblend.

* * * * *